United States Patent [19]
Zographos et al.

[11] 3,900,318
[45] Aug. 19, 1975

[54] USE OF SUBLIMABLE DISPERSE DYES IN PHOTOELECTROPHORETIC IMAGE REPRODUCTION

[75] Inventors: Georgeos Zographos, Zurich; Peter Mockli, Basel, both of Switzerland

[73] Assignee: Ciba-Geigy AG, Basel, Switzerland

[22] Filed: May 14, 1973

[21] Appl. No.: 360,234

[30] Foreign Application Priority Data
May 23, 1972  Switzerland.................... 007595/72

[52] U.S. Cl........................ 96/1.3; 96/1 PE; 96/1.2
[51] Int. Cl............................................ G03g 13/06
[58] Field of Search...................... 96/1.3, 1 PE, 1.2; 101/470

[56] References Cited
UNITED STATES PATENTS

| | | | |
|---|---|---|---|
| 2,503,759 | 4/1950 | Murray | 117/37 |
| 3,246,148 | 4/1966 | Troeyer et al. | 101/470 |
| 3,363,577 | 1/1974 | Blake | 101/470 |
| 3,384,566 | 5/1968 | Clark | 96/1 PE |
| 3,511,650 | 5/1970 | Shely et al. | 96/1 |
| 3,647,660 | 3/1972 | Wells | 96/1.3 |
| 3,655,370 | 4/1972 | Carreira et al. | 96/1.3 |

*Primary Examiner*—Norman G. Torchin
*Assistant Examiner*—John L. Goodrow
*Attorney, Agent, or Firm*—Joseph G. Kolodny; Edward McC. Roberts; Michael W. Glynn

[57] ABSTRACT

The present invention relates to a process wherein disperse dyes which can be converted into the vapour state at temperatures between 160° and 220° C under atmospheric pressure are used in photoelectrophoretic image reproduction and to the use of the image obtained according to the said process for reproducing a symmetric image on a surface other than the injector electrode or blocking electrode, or both by heating this image in contact with said surface to the sublimation range of the dyes used.

4 Claims, 1 Drawing Figure

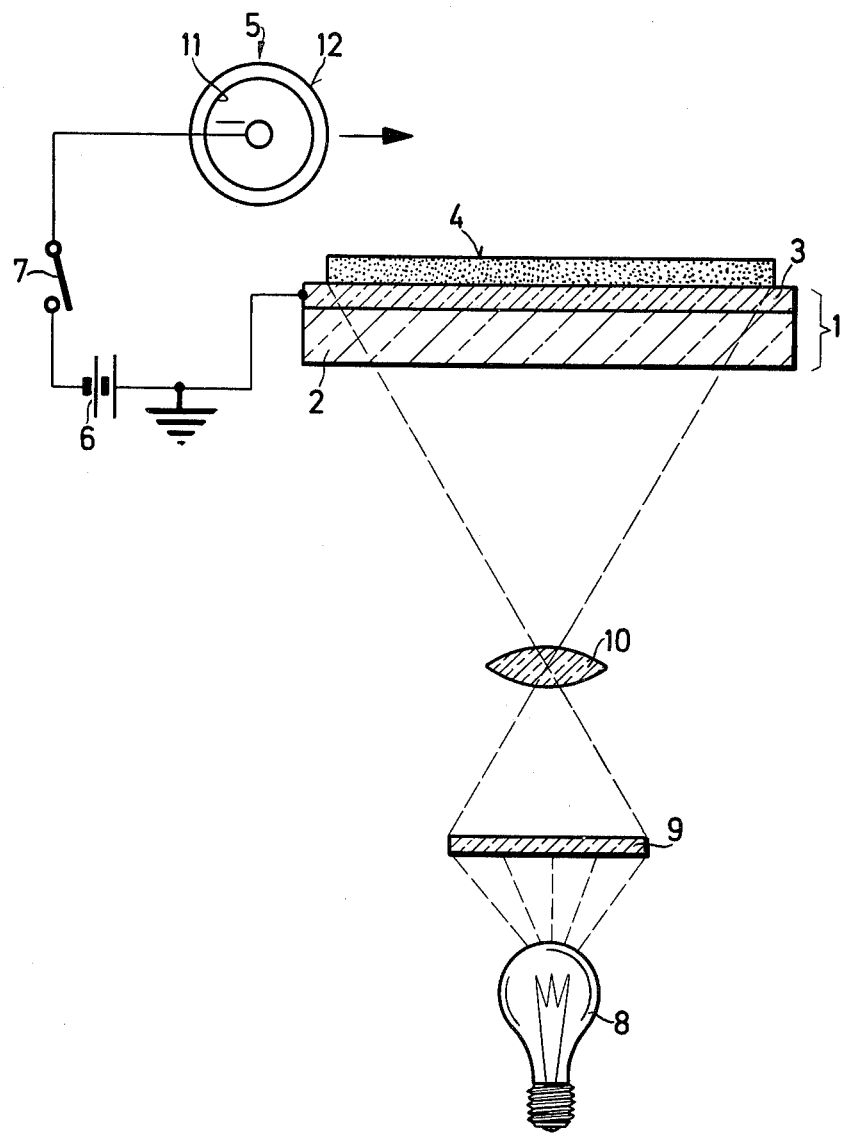

USE OF SUBLIMABLE DISPERSE DYES IN PHOTOELECTROPHORETIC IMAGE REPRODUCTION

It is known that monochromatic or polychromatic reproductions can be reproduced electrophoretically by using photoconductive organic pigments. This process is described e.g. in U.S. Pat. Nos. 3.384.565, 3.384.566 and 3.385.480. In an image reproducing system of this kind differently coloured, electrically sensitised dyestuff particles are finely suspended in a non-conductive liquid carrier. Between electrodes, of which at least one is partly transparent, the suspension is exposed to an electric field and is irradiated with an image through the transparent electrode.

The selective migration of the dyestuff particles in the electric field leads to the formation of an image on one or both electrodes.

The suspended particles, which must be electrically sensitised, are a basic component of the system. It is evident that these particles undergo a charge alternation during the exposure to an activating electromagnetic radiation, probably caused by interaction with one of the electrodes. Particles of a single colour are used in a monochromatic system, in the process whereof a plain coloured image is produced which is equivalent to an ordinary black and white image. In a polychromatic system the images are produced in natural colour, since there are used mixtures of paticles of two or more different colours which in each case are senstive to light of a specific wavelength or of a narrow wavelength field.

Hitherto only a few pigments have been known which satisfy the stringent requirements of the electrophoretic reproduction technique. The suitable dyestuffs must be distinguished by the following characteristics: pure shade, high tinctorial strength, fastness to light, insolubility in water and organic solvents, and pronounced photosensitivity. Further, it is important that the photosensitivity maximum should be as far as possible in the same wavelength as the light absorption maximum. The dyestuffs must also be sufficiently transparent so that an intense, deep black results in the superimposing of three toners.

The discovery has now been made that excellent results are attained by using the following disperse dyes which sublime between 160° and 220°C:

($F_1$=) 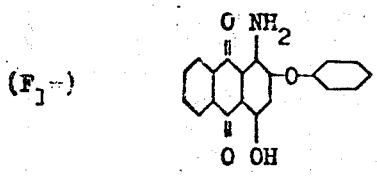 red ($F_2$=) 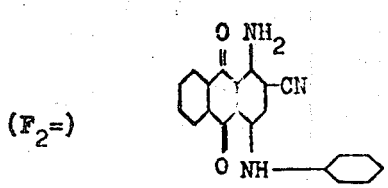 blue ($F_3$=) 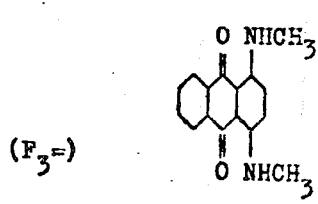 blue ($F_4$=) 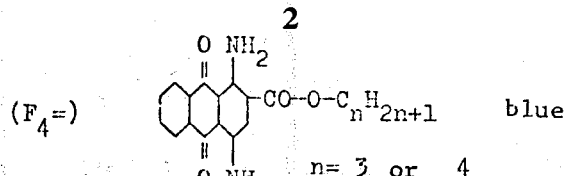 blue
n = 3 or 4

($F_5$=) 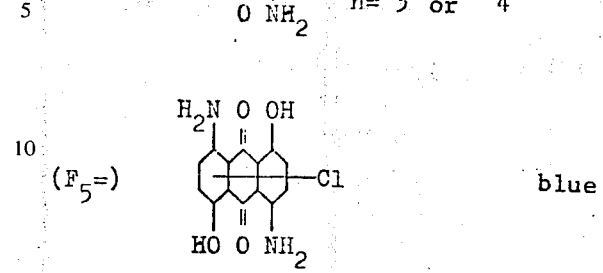 blue ($F_6$=) 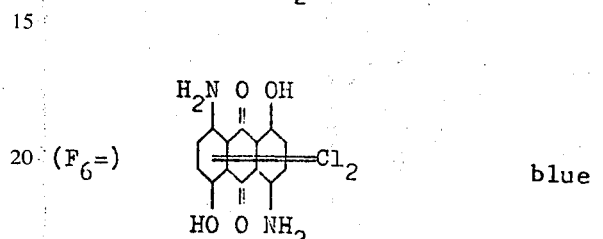 blue ($F_7$=) 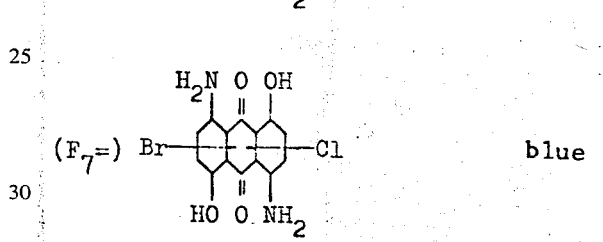 blue ($F_8$=) 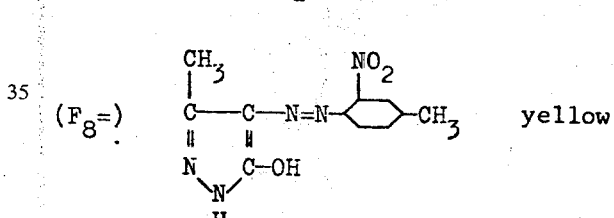 yellow ($F_9$=) 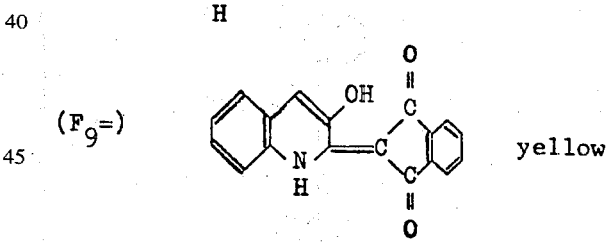 yellow ($F_{10}$=) 2-hydroxy-6-methyl-4'-acetylaminoazobenzene yellow ($F_{11}$=) 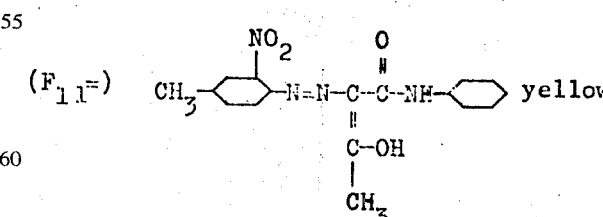 yellow ($F_{12}$=) 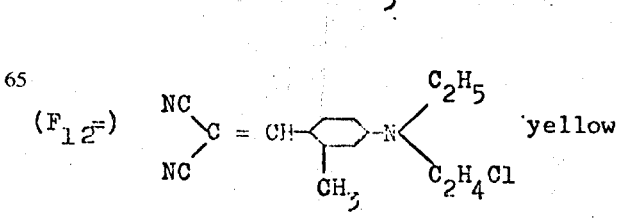 yellow F 13: 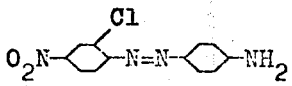

F 14: 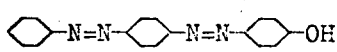

F 15: 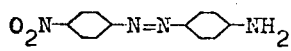

F 16: 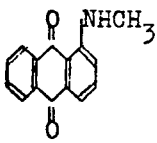

F 17: 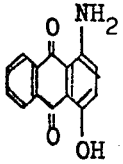

F 18: 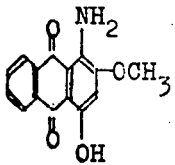

F 19: 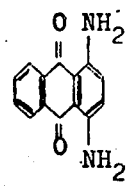

F 20: 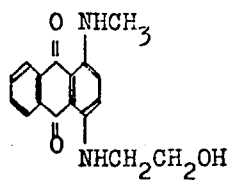

F 21: 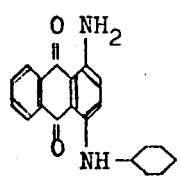

F 22: 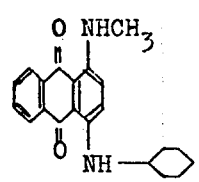

F 23: 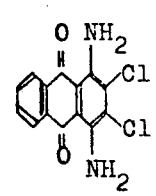

F 24: 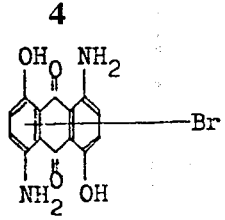

The dyes are preferably dispersed, the particle size being suitably below $10\mu$ and advantageously between 0.1 to $5\mu$. It is of advantage if the particles are uniform in size.

The toners can contain a binder which enables the dyestuff particles to be fixed to the final image carrier. The specific resistance of the binder shall be greater than $10^{10}$ ohm cm, advantageously greater than $10^{12}$ ohne cm. Suitable for this purpose are natural, semi-synthetic or synthetic resins, such as esters of abietic acid, tetrahydroabietic acid, and cellulose, cellulose ethers, chlorinated rubber, vinyl resins, for example polyvinyl chloride, polyvinyl acetate, copolymers of vinyl chloride and vinyl acetate, polyvinyl acetals, polyvinyl alcohols, polyvinyl ethers, polyvinyl carbazole, polyisobutylene, polybutadiene, polyacrylic or polymethacrylic esters, polystyrene, polyacrylonitrile, or silicone resins. From the series of condensation resins there may be cited for example: phenol-formaldehyde resins, ureaformaldehyde resins, melamine-formaldehyde resins, aldehyde or ketone resins, polyamides, polyurethanes, or epoxy resins.

It proves advantageous, for example while grinding or kneading the toner with the binder, to attain as intimate an intermixing of the two components as possible. In doing so, it is possible to attain simultaneously the desired reduction of the particle size on using a crude pigment.

The use according to the invention of the above mentioned dyes in photoelectrophoretic image reproducing systems in dealt with mor closely in the following detailed exposition, with reference to the enclosed drawing.

The drawing shows a transparent, platelike electrode 1, which consists in this case of a layer of optically transparent glass which is covered with a thin, optically transparent and conductive layer 3 of either tin oxide or $SnO-In_2O_3$ or $Sn-Sb_2O_5$. This material is available commercially under the registered trademark "NESA glass." This electrode is hereinafter referred to as "injector electrode." The surface of the injector electrode 1 is coated with a thin layer of fine, electrically sensitised dyestuff particles dispersed in an insulating liquid carrier. The term "sensitised" is to be understood according to the invention as the property of a particle to undergo a charge alternation brought about by an interaction with an electrode, or with the immediate ambiency, through the influence of light. After it has been attracted by the injector electrode, it migrates away from the electrode under the influence of an applied electric field, when an irradiation with an actinic electromagnetic radiation takes place. A more detailed explanation of the probable course of the mechanism is to be found in U.S. Pat. Nos. 3.384.565, 3.384.566, 3.385.488, and French Pat. No. 1.450.843. The liquid suspension 4 can further contain a sensitising agent and/or a binder for the dyestuff particles. These agents are at least partly soluble in the suspension or carrier liquid, as will be described in more detail hereinbelow.

Contiguous to the liquid suspension is a second metal electrode 5, which serves as conterelectrode to electrode 1 for producing the electric field. It is referred to hereinafter as "blocking electrode." The electrode is connected to one side of the power source 6 by a switch 7. The opposite side of the power source 6 is connected to the injector electrode 1, so that, as soon as an exposure takes place, the switch 7 is closed and an electric field is applied at right angles to the liquid suspension 4 between the electrodes 1 and 5. An image reproducing system consisting of a light source 8, a photographic transparency and e.g. a lens 10 irradiates the dispersion 4 with a photographic image of the transparency 9 to be reproduced. The electrode 5 is constructed in the form of a roller with a conductive core 11 which is connected to the power source 6. The core is covered with a layer of insulating material 12, e.g. baryta paper. The dyestuff suspension is irradiated with the image to be reproduced, a voltage being applied at right angles to the blocking and injector electrodes by closing the switch 7. The roller 5 is rolled over the top surface of the injector electrode 1 with the switch 7 closed during the image irradiation.

The irradiation with light causes exposed dyestuff particles, which originally have been attracted e.g. by the electrode 1, to migrate though the liquid and to adhere firmly to the surface of the blocking electrode. In doing so they leave behind on the surface of the injector electrode a dyestuff image which is a duplicate of the photographic transparency 9. After the irradiation the electric field is switched off by opening the switch 7. The relatively volatile carrier liquid evaporates and a powder dyestuff image remains. This dyestuff image can subsequently be fixed then and there, for example by applying a coating layer to the top surface or using a dissolved binder in the carrier liquid, for example paraffin wax. It is also possible to use another suitable binder which exits from the solution when the carrier liquid evaporates.

The carrier liquid itself can be a liquid paraffin wax or another suitable binder. According to another embodiment, the dyestuff image, which remains behind on the injector and/or blocking electrode, can be transmitted on to another surface and fixed thereon, for example by heating to the sublimation range of the dyes used. As will be explained in more detail later, this system can produce either monochromatic or polychromatic images according to the type as well as to the number of dyes which are suspended in the carrier liquid, and according to the colour of the light with which this suspension is irradiated in carrying out the process. Any suitable insulating liquid can be used as carrier for the dyestuff particles in the system. Typical carrier liquide are decane, N-tetradecane, paraffin, beeswax, or other thermoplastic materials. Sohio Odorless Solvent 3440 (a kerosene fractionn marketed by the Standard Oil Company, Ohio), Isopar-m, Isopar-H, Isopar-L, Isopar-G and Isopar-E (a branched-chain, saturated aliphatic hydrocarbon marketed by the Esso Oil Company, N.J. Images of good quality are obtained at voltages between 1000 and 5000 volts applied on using the device illustrated in the enclosed drawing. The amount of dye in the insulating liquid is advantageously from 2% – 10%. The addition of smaller amounts of electron donors or acceptors to the suspensions effects a marked improvement in the sensitivity of the system.

In a monochromatic system, particles of the same composition are dispersed in the carrier liquid and irradiated with a black-white image. A monochromatic copy of the original, corresponding to a normal black and white image, is thereby obtained. In a polychromatic system, the particles are so selected that those with different colours respond to the different wavelengths in the visible spectrum according to their principal absorption bands. Further, dyes are to be so chosen that their spectral response curves do not appreciably overlap, so that a colour separation and a substractive multi-colour image reproduction is possible. In a typical multi-colour system the particle dispersion should contain bluish green particles which are sensitive principally to red light, purple particles which are sensitive principally to green light, and yellow particles which are sensitive principally to blue light. When mixed in a carrier liquid these particles produce a liquid of black appearance. If one or more of these particles migrate from the electrode 1 in the direction of the upper electrode, then particles remain which produce a colour equivalent to that of the impinging light. For example, an irradiation with red light causes the bluish green particles to migrate, the purple and yellow particles then remaining behind. The combination of these colours produces a finished red image. In the same way, blue and green colours are reproduced by removing yellow and purple colours respectively. When white light impinges upon the mixture, then all the particles migrate so that the transparent substrate remains. If no irradiation takes place, then all the particles remain, which together yield a black colour. This is an ideal method for substractive colour reproduction because the particles consist in each case not only of one component, but fulfil in addition the dual function of an image colourant and a sensitised medium.

The dyes used according to the invention are very suitable for use in a photoelectrophoretic mono- or polychromatic image reproducing system. Their good spectral response and their high sensitivity bring about the formation of dense and brilliant images.

The following Examples illustrate the invention, the parts and percentages being by weight unless otherwise stated. These Examples illustrate various embodiments of the photoelectrophoretic image reproducing system, but do not limit the invention thereto.

The following Examples are carried out in a device corresponding to the type illustrated in the enclosed drawing. The image reproducing mixture 4 is applied to a NESA glass substrate. The irradiation is effected through this glass. The NESA glass surface is connected in series to a switch, a power source, and a conductive core of a roller which is coated on its surface with baryta paper. The roller has a diameter of about 67 mm (2.6 inches) and travels over the plate surface at a speed of about 1.45 cm per second. The NESA plate used measures about $10 \times 15$ cm$^2$ and is irradiated with a light intensity of 2000 lux (about 2000 footcandles) measured on the non-coated NESA glass surface. The size of the voltage applied is 2500 volts. The irradiation is performed with a 3200° (Kelvin scale) lamp through a neutral, dense wedge filter for measuring the sensitivity of the suspensions to white light and through Wratten filters 29, 61 and 47b, each of which is placed in front of the light source in order to measure the sensitivity of the suspensions to red, green, and blue light in separate tests.

The dyes according to the invention are also suitable for other photoelectrophoretic image forming processes, for example that described in Swiss priority application 18618/70 (Case 7307).

EXAMPLE 1

One-amino-4-hydroxy-2-phenoxy-anthraquinone with an average particle size of maximally $1\mu$ is suspended in 90 g of Isopar E (a saturated aliphatic hydrocarbon, ESSO Standard). The resulting paste is used directly for the above describe process or is first diluted with further Isopar E. Brilliant, red images of outstanding transparency and clarity are obtained.

EXAMPLE 2

The process as described in Example 1 is carried out, but using as toner one of the dyes $F_2$–$F_{24}$ listed in the description herein, or a mixture of equal parts of the dyes $F_5$, $F_6$ and $F_7$. Brilliant, transparent, yellow or blue shades are obtained.

We claim:

1. In a process for producing an image by the photoelectrophoretic image reproducing system, comprising the steps of (a) irradiating with light a volatile liquid dyestuff suspension, causing migration of said dyestuff in said suspension from an injector electrode to a blocking electrode, (b) evaporating the volatile liquid to leave a powder dyestuff image on the injector electrode or the blocking electrode or both and, (c) fixing the image, the improvement comprising using as said dyestuff a disperse dye or a mixture of disperse dyes which can be converted into the vapor state at temperatures between 160°C and 220°C under atmospheric pressure.

2. A process according to claim 1, wherein a sublimable disperse dye which corresponds to one of the formulae $F_1$ to $F_{24}$ is used in photoelectrophoretic image reproduction.

3. A process according to claim 1, wherein the size of the dyestuff particles is between $0.1\mu$ to $5\mu$.

4. A process wherein an image obtained according to claim 1 is used for reproducing a symmetric image on a surface other than the injector electrode or blocking electrode, or both, which process consists in heating this image in contact with said surface to the sublimation range of the dyes used.

* * * * *